United States Patent Office 3,397,119
Patented Aug. 13, 1968

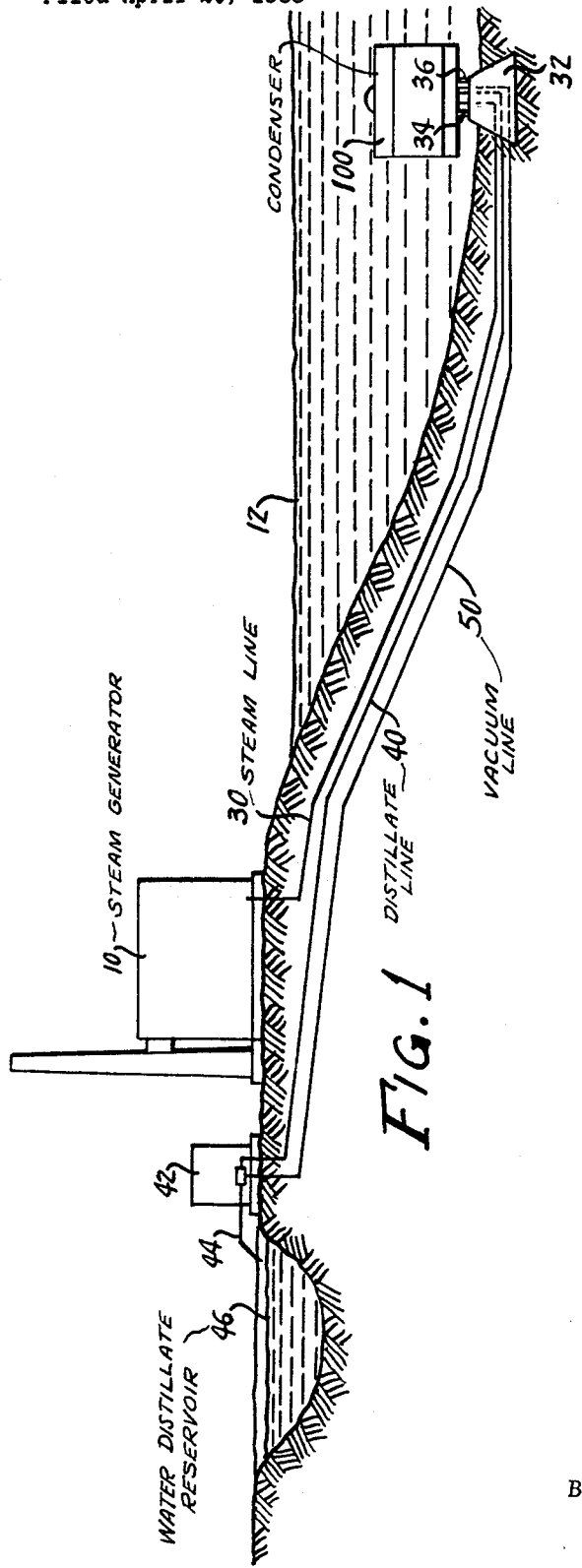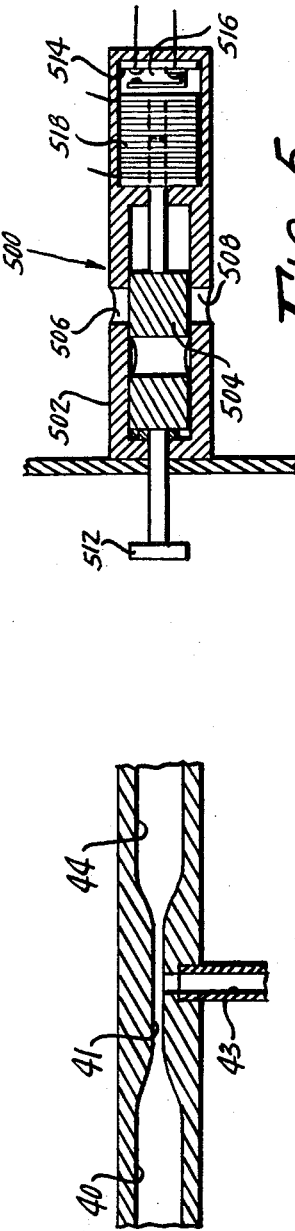

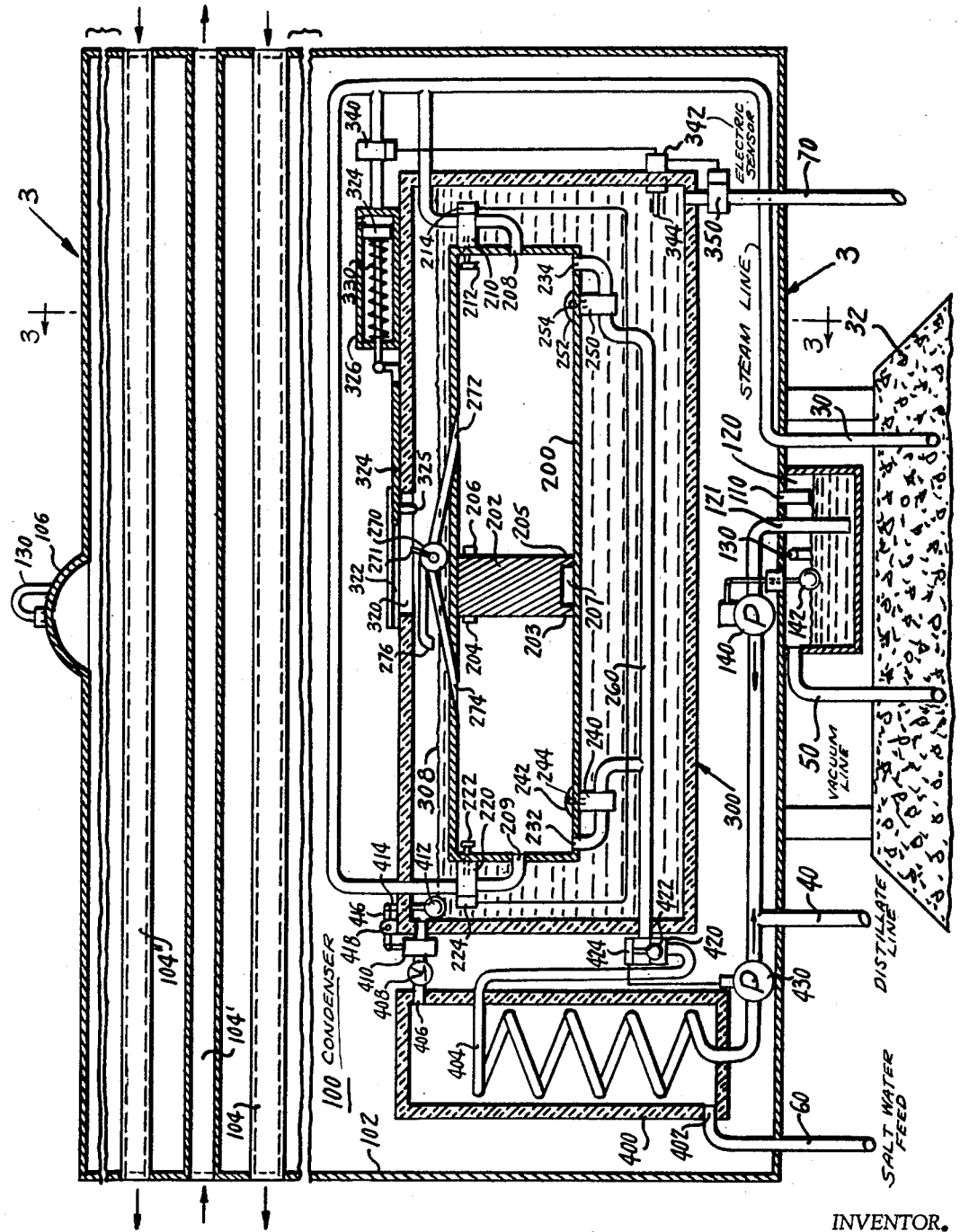

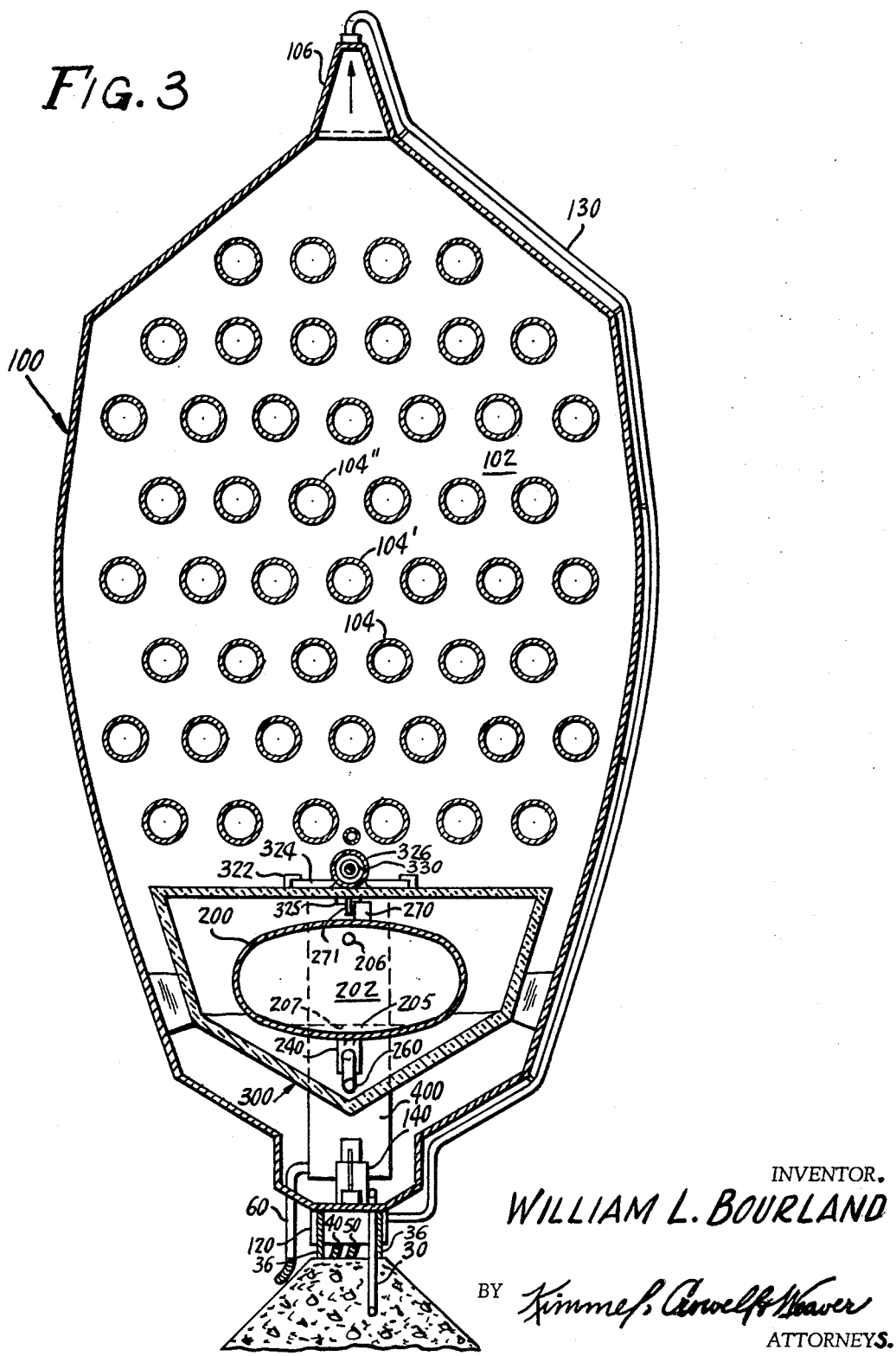

3,397,119
SALT WATER DISTILLATION AND CONDENSATION UTILIZING ALTERNATE STEAM EXPANSION-COMPRESSION HEAT CYCLE TO EVAPORATE SALT WATER
William L. Bourland, 6350 Everest Way,
Sacramento, Calif. 95842
Filed Apr. 20, 1966, Ser. No. 544,013
5 Claims. (Cl. 203—11)

ABSTRACT OF THE DISCLOSURE

A condensation system and method for the production of fresh water from salt water and the like which includes an outer vessel which is cooled to condense and collect vapors, a salt water containing vessel therein, a cylinder with a freely slideable plug therein disposed inside this salt water containing vessel and an electrical and fluid interconnection system for supplying steam to the inside cylinder for moving the plug reciprocably therein and condensing the steam and thereby transferring the latent heat of evaporation to the salt water to produce vapor therefrom which is condensed and collected in the outer vessel and conduit systems for the recovery of fresh water at all stages and a method for condensation of steam is disclosed.

This invention relates to a condenser and to a process of condensation for the production of distilled liquids from vaporous media wherein the heat of vaporization of the vaporous media is utilized. More particularly, this invention relates to a process for condensation of steam in the production of fresh water from salt water and to apparatus for carrying out the process. Specifically, this invention relates to an apparatus for causing the expansion and condensation of steam at substantially constant pressure.

One of the most serious economic and technical problems facing United States and many parts of the world relates to providing adequate supplies of fresh water for domestic, industrial and agricultural purposes. The problem of providing fresh water in adequate quantities and at a cost which is economically feasible is generally attacked from the point of view of providing lower cost sources of energy for the production of steam. There are other approaches also to the solution of this serious problem. Much of the effort directed to finding cheaper sources of energy for the production of steam is wasted by inefficient methods and apparatus for recovering the energy imparted to the steam during the distillation process. It is an object of this invention to provide apparatus and methods for highly efficient recovery of energy from steam and for the recovery of fresh water produced thereby.

It is an object of this invention to provide apparatus for producing fresh water from steam directly and utilizing the heat of vaporization of the steam to produce additional fresh water.

It is an additional object of this invention to produce an apparatus for causing the expansion and condensation of steam at substantially constant pressure and the recovery of the heat of vaporization.

It is a further object of this invention to provide a process for the production of fresh water from steam and for the recovery of the heat of vaporization of steam by causing the steam to expand and to condense at substantially constant pressure and to transfer the heat of condensation to a second body of water to provide additional steam and fresh water therefrom.

It is a still further object of this invention to provide an apparatus which is submersible in the ocean or other large body of water whereby it is possible to utilize the body of water as a heat sink in the condensation of steam in the production of fresh water.

It is a further object of this invention to provide a condenser in which a vapor is caused to expand at substantially constant pressure and to transfer the heat of vaporization released by the condensation of the vapor to a second volatile material for the production of an additional amount of the vapor or of a different vapor and the recovery thereof.

It is a further object of this invention to provide an apparatus in which a vapor is caused to expand at substantially constant pressure in a cylinder, the cylinder being provided with a slidably mounted plug which reciprocably moves in response to pressure exerted by the vapor.

Other objects of this invention will become apparent from the following specification and the drawings.

FIGURE 1 is a schematic view of the overall system for producing fresh water from salt water;

FIGURE 2 is a condenser which is submersible in a large body of water for utilizing the body of water as a heat sink and for condensing steam in a two stage condensation process;

FIGURE 2a is a detail cross-sectional view of the wall construction of the condenser;

FIGURE 3 is a vertical view of the apparatus of FIGURE 2 on a reduced scale and in partial cross section taken substantially along line 3—3 of FIGURE 2;

FIGURE 4 is a Venturi nozzle for producing a vacuum in the apparatus shown in FIGURE 2 and FIGURE 3; and FIGURE 5 is a valve of the type which may be used in this invention shown in cross section.

Referring now to FIGURE 1, the system includes a steam plant 10. The steam plant may be of a conventional type, for example it may use such fossil fuels as coal, oil, or gas. It may, in addition, be a nuclear powered steam plant of a type recently proposed. The nature of the steam plant is not important to this invention.

The steam plant is preferably located on the shore of a large body of water 12 which in a preferred embodiment may be a body of salt water such as the ocean. It is not an essential part of this invention, however, that the system be located on a large body of water since it would be possible to substitute the cooling of the body of water, as hereinafter described, by such conventional means as pumps, evaporators, and other equipment known to the art. In addition, the system of this invention may be utilized for producing fresh water from brackish water or from sewage.

Steam is carried by means of a line 30 to the condenser 100 of this invention which, in the preferred embodiment, is submerged in the body of water 12 and is anchored to the bottom thereof by an anchor member 32 which is attached to the condenser by cables 34 and 36. The condenser 100 because of its displacement tends to float and will therefore remain in the body of water above the anchor 32.

Fresh water from the condenser is returned by means of a pipe or conduit 40 to a collection station 42 and through pipe 44 to a fresh water reservoir 46. Of course it will be understood that there may be a plurality of condensers of the type described herein for a single steam plant. It will also be understood that the steam line 30 will be insulated in the conventional manner. In addition to lines 30 and 40 going to the condenser 100, there may be such other lines as are necessary, for example, the vacuum line 50, the function of which will be described hereinafter. Additional utility lines and power cables will be provided in the manner conventional to the art and are not shown on FIGURE 1 for purposes of clarity.

With reference now to FIGURE 2, the structure of the condenser 100 will be described. Steam enters the condenser from line 30, and fresh water leaves the condenser 100 through line 40, as shown in FIGURE 1. Vacuum line 50 is also connected to condenser 100 as will be described hereinafter. Two additional lines, a salt water intake line 60 and a salt water exhaust line 70, connect to the condenser 100. The interconnection and function of these lines will be described. Condenser 100 comprises in its major components a wall 102 and a plurality of cooling tubes 104 and a vapor collection dome 106. Included within the condenser is an elongate cylinder 200 enclosing a plug 202 which is slidably mounted within the cylinder 200 and which may reciprocably move within the cylinder when pressure is applied unequally to the two sides. Plug 202 carries on the opposing sides thereof operating members 204 and 206. Steam may enter the right end of the cylinder 200, as viewed in FIGURE 2, by a vent 208 through valve 210 when valve 210 is open. Valve 210 may be opened or closed by a slide operator 212. The position of slide operator 212 may selectively actuate electrical sensing device 214, the function of which will be described. Without further description it will be seen that when plug 202 moves to the extreme right of cylinder 200, operating member 206 contacts slide operator 212 on valve 210 and will cause valve 210 to open permitting steam to enter through vents 208. This exerts a pressure against the right side of plug 202 causing it to move to the left down cylinder 200.

Steam may also enter cylinder 200 at the left end, as viewed in FIGURE 2, through vent 209 to valve 220 which is actively opened and closed by slide operator 222 and which carries electrical sensor 224. It will be seen then that plug 202 may move reciprocably within cylinder 200 being moved, for example, first to the left by steam pressure entering from vents 208 until operating member 204 contacts slide operator 222 on valve 220 opening valve 222. The function of electrical sensors 214 and 224 is to electrically close valve 210 when valve 220 is opened by operating member 204 and, conversely, to close valve 222 when operating member 206 contacts slide operator 212 closing valve 210. Valves 210 and 220 remain in the open or closed position until operated either by operating members 204 or 206 or by electrical sensors 214 and 224. Electrical sensors 214 and 224 include solenoid operators and are of a type known to the art. An exemplary valve of this type is shown in FIGURE 5.

Fresh water, the condensate of the steam which enters cylinder 200, is removed through exit ports 232 and 234 and through valves 240 and 250 respectively. Valves 240 and 250 may be identical and are operated in response to the reciprocable movement of plug 202. As plug 202 moves to the left in cylinder 200 it will move over diaphragm cover 242 and operate a slide member 244 opening valve 240 in a manner similar to that described with respect to valves 210 and 220. The slide operator in valve 240, however, is spring biased in the upward direction holding it in a closed position until a downward force is exerted. Thus when plug 202 moves to the left, the downward edge 203 of plug 202 actuates slide operator 244 opening valve 240, but continued movement to the left of plug 202 causes the slide operator and the diaphragm cover to return to the upward position in recess 207 which is in the bottom of plug 202. At this point operating member 204 will contact slide operator 222 of valve 220 opening valve 220 and causing plug 202 to move to the right. The movement to the right of plug 202 causes momentary opening of valve 240 and forces any remaining condensate through exit port 232. Operation of valve 250 by a downward force exerted by the edge 205 of plug 202 on diaphragm cover 252 causes slide member 254 to open valve 250 causing the condensed fluid to exit through exit port 234 in the manner previously described with respect to exit port 232 and valve 240. The reciprocable movement of plug 202 in piston 200, then, is caused by alternately feeding steam to the respective ends of cylinder 200 and results in removing the condensate alternately from the ends of cylinder 200.

The reciprocable movement of plug 202 in cylinder 200 in response to the exertion of pressure by the steam results in the steam being expanded at substantially constant pressure. During the expansion at constant pressure, the steam condenses. Cooling is provided on the outside of the cylinder in a manner to be described. Apparatus is provided for carrying out the process of simultaneously expanding steam at constant pressure and condensing the steam at constant pressure and, as will be seen, transferring the heat vaporization to a second media.

In the preferred embodiment the cylinder 200 is elliptical in cross section. This shape has numerous advantages; for example, the use of an elliptical cylinder and elliptical plug slidably received therein stabilizes the plug's position so the valves can be actuated by certain accessories on the plug, for example, operating members 204 and 206. It will be understood, of course, that the valving arrangement and the entrance and exit arrangements for the steam and for the condensed fresh water are merely exemplary. Other valves may be substituted without departing from the intent and spirit of this invention. For example, purely mechanical slide valves could be substituted for valves 210 and 220 and a mechanical linkage could be provided between them. Similarly, mechanically operated slide valves of different nature or, valves actuated electrically or mechanically could be substituted for valves 210, 220, 240 and 250. The exact nature of the valves is not an essential part of this invention.

Similarly, the exact shape of the cylinder is not an absolutely essential part of this invention, however, an elliptical shaped cylinder is preferred.

Cylinder 200 is substantially enclosed in a vessel 300 which is preferably of a thick insulated wall structure, shown in FIGURE 2a. The wall structure may consist of an inner wall 302 and an outer wall 304 of corrosion resistant alloy, the intermediate space being filled with insulation 306. Vessel 300, during continuous operation, is normally filled to a level above the top of cylinder 200, the water level being shown at 308. Salt water enters the condenser 100 through pipe 60 and into a heat exchanger 400 which has a wall structure of the type described with respect to vessel 300. The salt water enters at port 402 and moves upwardly past heat exchange coils 404 and exits through exit port 406 to one-way valve 408 and a level control valve 410. Valve 410 is selectively opened in response to the water level in vessel 300 as sensed by float 412 which operates valve 410 by means of rod 414, leveler 416 which is pivotally connected at a fulcrum 418. When the water level falls below the desired point, float 412 moves out of the opening valve 410 permitting water to flow into vessel 300 to return the water level to a desired position. In a preferred embodiment, salt water may be obtained directly from the body of water in which the condenser 100 is immersed. For example, if cylinder 100 is immersed in the ocean or a body of salt or brackish water, all that is necessary is to provide an opening into pipe 160. It may be desirable to place the opening at a remote location for reasons which will be described later.

Heat is supplied to heat exchanger 400 by causing the condensate from cylinder 200 to flow through heat exchanger 400. The condensate is collected from valves 240 and 250 in line 260 and flows through valve 420 and through heat exchange coil 404 to pump 430 and then out line 40 to the fresh water reservoir. Valve 420 includes a float 422 which is responsive to the water level in the valve 420. Pump 430 is actuated when the water level in valve 420 reaches a predetermined level by means of electrical sensor 424. Electrical sensor 424 operates in a manner similar to that described with regard to valve 210 and valve 220, shown in FIGURE 5. It will be seen, then, that pump 430 will operate only when condensate, fresh water, is being supplied from cylinder 200. Vessel 300 is supplied with a port 320 and a flange 322 in which rides a cover 324 which may selectively be operated by a steam ram 326 which includes piston 328 which is spring biased to the right by means of spring 330. Steam ram 326 is operated and cover 324 closes vessel 300 when steam is applied through valve 340. Valve 340 is opened in response to a signal from condition responsive element 342, which has sensing elements thereon 344. Condition responsive element 342 also opens valve 350 to line 70. In the preferred embodiment condition responsive element 342 causes valves 340 and 350 to open when the salt concentration in the chamber reaches a predetermined level. Thus, when the salt concentration reaches a level where evaporation is no longer efficient, because of surface tension, condition responsive element 342 actuates valve 350 to open the dump line 70 from vessel 300 and valve 340 which closes the top of chamber 300 by means of cover 324. Cover 342 carries on it a downwardly extending protuberance 325 which operates valve 270 by moving handle 271, of valve 270, to the left, as shown in FIGURE 2. Movement to the left of handle 271 opens valve 270 permitting steam to flow from inlet 272 or 274 through valve 270 and out exit port 276 into chamber 300.

It will be apparent from the foregoing that an apparatus is provided for carrying out a process wherein steam is caused to expand and to condense at substantially constant pressure and the heat of vaporization released by the condensation of the steam at constant pressure is transferred to a material which is volatile or contains volatile components, for example, salt water. The salt water, in the preferred embodiment, is caused to heat up and to evaporate. The water vapor from the salt water leaves vessel 300 which selectively communicates with the vessel enclosed by walls 102. The water vapor is then condensed by contact with cooling tubes 104. The water condensate is collected in the bottom of condenser 100 and leaves vessel 100 through exit port 110, entering a vacuum trap 120. In the preferred embodiment the condenser 100 is operated at a partial vacuum to increase the efficiency of the condensation process. The vacuum is caused by exhausting condenser 100 through line 130 which is attached to the top of condenser 100 in vapor chamber 106. Pipe 130 enters trap 220 where the vapors carried past the cooling tubes 104 are condensed and trapped. The vacuum is provided by exhausting pipe 130 through line 50 by a vacuum pump which will be described. Fresh water which is produced by condensing the water vapor on cooling tube 104 and by condensing the vapors in line 130 is pumped from chamber 120 in pipe 121 to pump 140 which is selectively operated in response to float controller 142. The fresh water is pumped, by means of pump 140, from trap 120 to line 40 and returns to the fresh water storage system.

The arrangement of the vapor dome 106 is better shown in FIGURE 3. Line 130 carries vapors which are now condensed on cooling tubes 104 to trap 120 which is located at the bottom of condenser 100.

Vacuum for condenser 100 may be provided by a vacuum pump located in collecting station 42. While any desired vacuum pump may be used, it is convenient to use a Venturi vacuum pump to maintain a partial vacuum in condenser 100. Such a Venturi pump is shown in FIGURE 4. In a preferred embodiment it may be desirable to use fresh water from line 40 to operate the Venturi pump as the fresh water flows from left to right as shown in FIGURE 4, from line 40 through the throat 41 to line 44 and thence to reservoir 46; as shown in FIGURE 1, air, gas, and fluids in general are drawn inwardly at entrance port 43. By this means if any water vapor is not condensed by the time the vapors leave trap 120, as shown in FIGURES 2 and 3, they will be condensed en route to the pumping station or will be condensed upon contact with the now cool fresh water. Of course a rotary vacuum pump or a positive displacement pump may be used to provide the vacuum in place of the Venturi of FIGURE 4.

Referring now to FIGURE 5, a slide valve 400 consisting of a shell 502 and a closure member 504 and entrance and exit ports 506 and 508, respectively, is shown. Closure member 504 is operated at one end by slide operator 512 and at the other end by electrical sensor 514. The electrical sensor 514 includes sensing contacts 516 and an operating solenoid 518. The closure member 504 remains in the position shown until slide operator 512 is pushed to the right as shown in FIGURE 5 opening valve 500. Valve 500 then remains open until a current is applied to solenoid 518 causing closure member 504 to move again to the left in the position shown. When slide operator 512 is pushed to the right, sensing contacts 516 are temporarily closed giving a signal to a desired point. With reference to FIGURE 2 again, valve 500 is of the type which may be used as valves 210 and 220. Electrical distributing means are not shown in FIGURES 2 and 3 for purposes of clarity.

An apparatus has been disclosed which permits the following process. A vapor may be condensed at substantially constant pressure with the heat of condensation being transferred to a volatile material. The volatile components of the material heated by the condensation of the vapor are then condensed and collected. While the process and the apparatus have been described with particularization to the distillation of salt water to produce fresh water, it is apparent that neither the process nor the apparatus is limited to this application. Thus the process may be used to condense any vapor to a liquid and may be used with reference to two separate materials where, for example, a first vapor is caused to condense at substantially constant pressure in the cylinder 200 while a second material is provided in vessel 300. In this case, the condensates of the vessel and the cylinder would not be combined. If, however, it is desirable, the same material may be used in cylinder 200 and vessel 300 and the combined condensate collected for use.

The apparatus and process are by no means limited to the production of fresh water from salt water, for example, fresh water may be produced from sewage water or from polluted water, however several important advantages are apparent with application to the production of fresh water from sea water. For example, the reciprocable movement of plug 202 in cylinder 200 maintains the heat exchange walls of cylinder 200 in a clean condition thereby promoting efficient transfer of heat through the walls. An inspection of the apparatus and a review of the process also reveals that essentially 100% of all the energy stored in steam is recovered. This recovery includes the very important heat of vaporization of the steam. It requires 540 calories to produce a gram of steam and in many distillation processes this latent heat of vaporization is wasted by permitting the steam to escape before condensation. The latent heat of vaporization, in the present process and apparatus, is transferred to a second body of volatile matter, salt water, where it causes further evaporization and subsequent condensation.

As illustrated in FIGURE 1, in the preferred embodiment the condenser is submerged; however, this is a desirable but not essential part of the invention. Other variations are possible without departing from the spirit of this invention; for example, the condition responsive sensing element 342 which, in the preferred embodiment, is sensitive to a salt concentration may be sensitive to condensed steam, or other physical characteristics or to concentration of materials other than salt. In addition, while it is inconvenient it would theoretically be possible to carry out the process in other apparatus; for example, a chamber constructed of resilient material which would expand upon the application of pressure thereto. Such structures are inconvenient and impracticable however.

The drawing and specification illustrate a process and apparatus and a preferred embodiment of the invention

I claim:
1. In a process for producing fresh water from salt water by vaporization and condensation, the improvement wherein the condensation process comprises
causing steam to alternately expand at substantially constant pressure and then be compressed and condensed,
transferring the heat of vaporization of the steam which is released upon condensation by indirect heat exchange with a body of the salt water from which fresh water is to be produced to cause evaporation of said body of salt water to produce water vapor therefrom,
condensing said water vapor, and
collecting and combining the fresh water distillate produced from condensation of the steam and the distillate produced by condensation of water vapor formed by evaporation of said body of salt water.

2. The process of claim 1 wherein the water vapor is produced and condensed under less than atmospheric pressure.

3. The method of claim 1 further comprising the step of:
maintaining the pressure above the body of liquid at less than atmospheric pressure.

4. The method of claim 1 further comprising the steps of:
maintaining the volume of the body of liquid by adding liquid;
periodically dumping the body of liquid to remove concentrated non-volatile components; and
forming a new body of liquid for absorbing the heat of vaporization.

5. The method of claim 4 further comprising the step of:
preheating the liquid entering the body of liquid by exchanging the heat of vapor leaving the first and second spaces with the entering liquid to the body of liquid.

References Cited

UNITED STATES PATENTS

| | | | |
|---|---|---|---|
| 2,339,862 | 1/1944 | Kleinschmidt | 203—2 |
| 2,584,211 | 2/1952 | Kraft | 202—185 |
| 2,625,506 | 1/1953 | Baer | 202—185.5 |
| 2,760,919 | 8/1956 | Latham | 202—185 X |
| 3,055,810 | 9/1962 | Skon | 203—2 |
| 3,183,174 | 5/1965 | Williamson | 202—2 |
| 3,235,469 | 2/1966 | Parke | 202—160 X |
| 3,322,650 | 5/1967 | Hillburn | 203—2 X |

OTHER REFERENCES

Mark's Mechanical Handbook, 6th edition, 1968, section 9, pp. 56, 57 and 60.

NORMAN YUDKOFF, *Primary Examiner.*

F. E. DRUMMOND, *Assistant Examiner.*